United States Patent
Bygrave

(10) Patent No.: US 10,604,384 B2
(45) Date of Patent: Mar. 31, 2020

(54) RAIL MEMBER AND RAIL SYSTEM

(71) Applicant: Gantry Railing Ltd., Gloucester (GB)

(72) Inventor: Peter Nathan Bygrave, Gloucester (GB)

(73) Assignee: GANTRY RAILING LTD., Gloucester (GB)

( * ) Notice: Subject to any disclaimer, the term of this patent is extended or adjusted under 35 U.S.C. 154(b) by 130 days.

(21) Appl. No.: 15/511,200

(22) PCT Filed: Sep. 15, 2015

(86) PCT No.: PCT/GB2015/052669
§ 371 (c)(1),
(2) Date: Mar. 14, 2017

(87) PCT Pub. No.: WO2016/042314
PCT Pub. Date: Mar. 24, 2016

(65) Prior Publication Data
US 2017/0247233 A1 Aug. 31, 2017

(30) Foreign Application Priority Data
Sep. 15, 2014 (GB) .................................. 1416269.7

(51) Int. Cl.
*B66C 7/08* (2006.01)
*E01B 9/68* (2006.01)
*F16F 1/40* (2006.01)
*F16F 15/08* (2006.01)

(52) U.S. Cl.
CPC .................. *B66C 7/08* (2013.01); *E01B 9/68* (2013.01); *F16F 1/40* (2013.01); *F16F 15/08* (2013.01)

(58) Field of Classification Search
CPC . E01B 9/68; E01B 9/683; E01B 9/686; E01B 9/62; E01B 9/36
See application file for complete search history.

(56) References Cited

FOREIGN PATENT DOCUMENTS

| CN | 202099700 | 1/2012 | |
|---|---|---|---|
| CN | 103987896 | 8/2014 | |
| EP | 0 620 317 | 10/1994 | |
| EP | 2607551 | * 6/2013 | ............ E01B 9/681 |
| EP | 2 662 489 | 11/2013 | |
| EP | 2662489 | 11/2013 | |

(Continued)

OTHER PUBLICATIONS

International Search Report and Written Opinion entered Nov. 13, 2015 in related PCT patent application PCT/GB2015/052669.

(Continued)

*Primary Examiner* — Robert J McCarry, Jr.
(74) *Attorney, Agent, or Firm* — Cislo & Thomas, LLP

(57) ABSTRACT

There is proposed a rail member [see: 102] comprising a resiliently flexible elongate substrate comprising first and second major surfaces, the member comprising at least one channel formation [see: 202] formed transversally relative to the longitudinal axis of the elongate substrate across at least one of the first or second major surfaces, according to a first embodiment, an insert [see: 304] is positioned between the first and second major surfaces; according to a second embodiment, an insert [see: 304] ex tends longitudinally along the member.

20 Claims, 6 Drawing Sheets

(56) References Cited

FOREIGN PATENT DOCUMENTS

Figure 1:
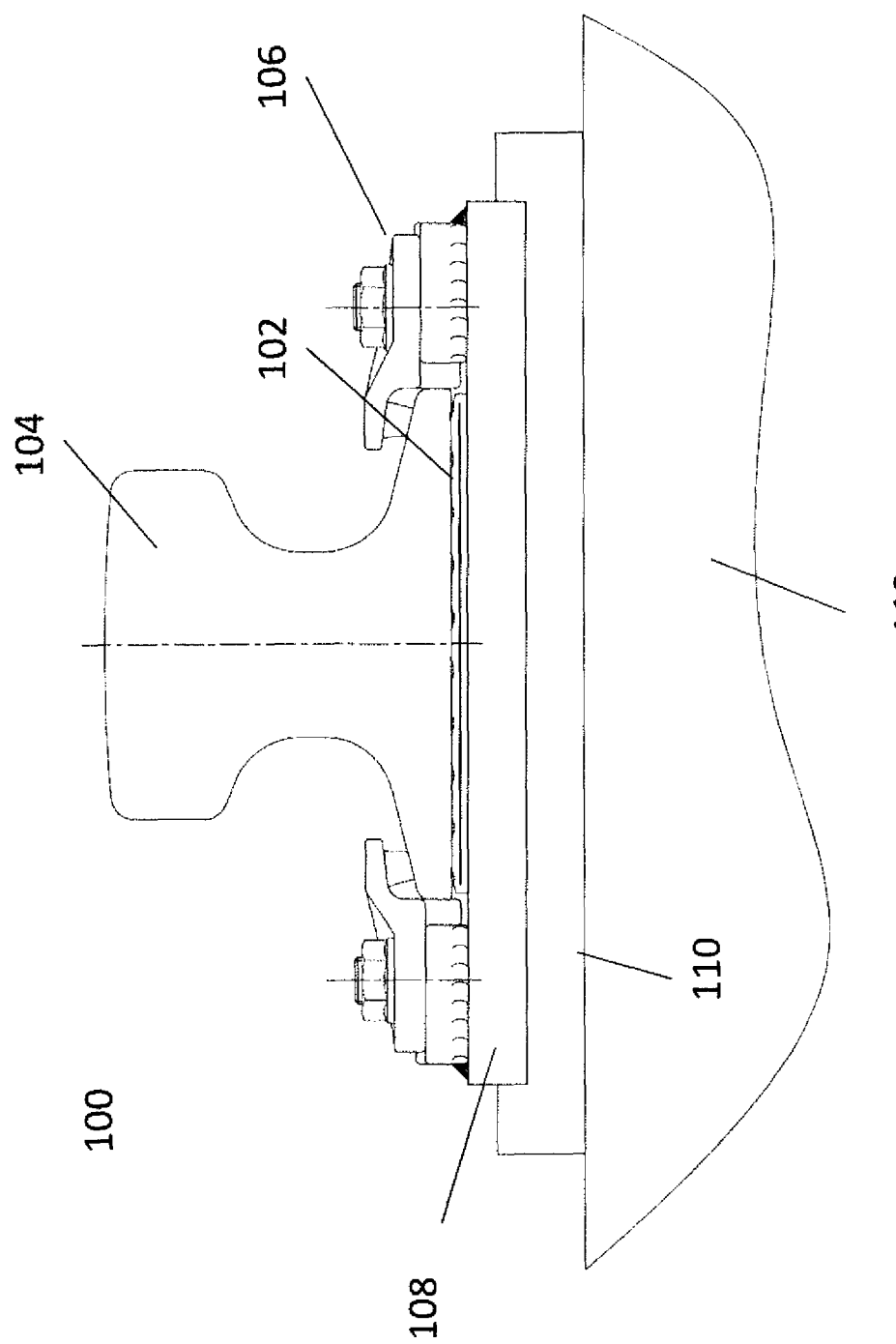

| FR | 2 377 478 | 8/1978 |
|---|---|---|
| FR | 2377478 | 8/1978 |
| GB | 678731 | 9/1952 |
| GB | 896 471 | 5/1962 |
| GB | 896471 | 5/1962 |
| GB | 945 569 | 1/1964 |
| GB | 946 936 | 1/1964 |
| GB | 945569 | 1/1964 |
| GB | 946936 | 1/1964 |
| GB | 2 419 367 | 4/2006 |
| GB | 2419367 | 4/2006 |
| JP | S52 35056 | 3/1977 |
| WO | WO 2013/092709 | 6/2013 |
| WO | WO2013092709 | 6/2013 |

OTHER PUBLICATIONS

International Search Report for GB1416269.7.
European Patent Office, "Communication Pursuant to Article 94(3) EPC," dated Feb. 15, 2019, 6 pages.
UK Intellectual Property Office, "Notification of Grant," dated Aug. 14, 2018, 2 pages.
European Patent Office, "Communication Pursuant to Article 94(3) EPC," dated Jul. 16, 2018, 6 pages.

\* cited by examiner

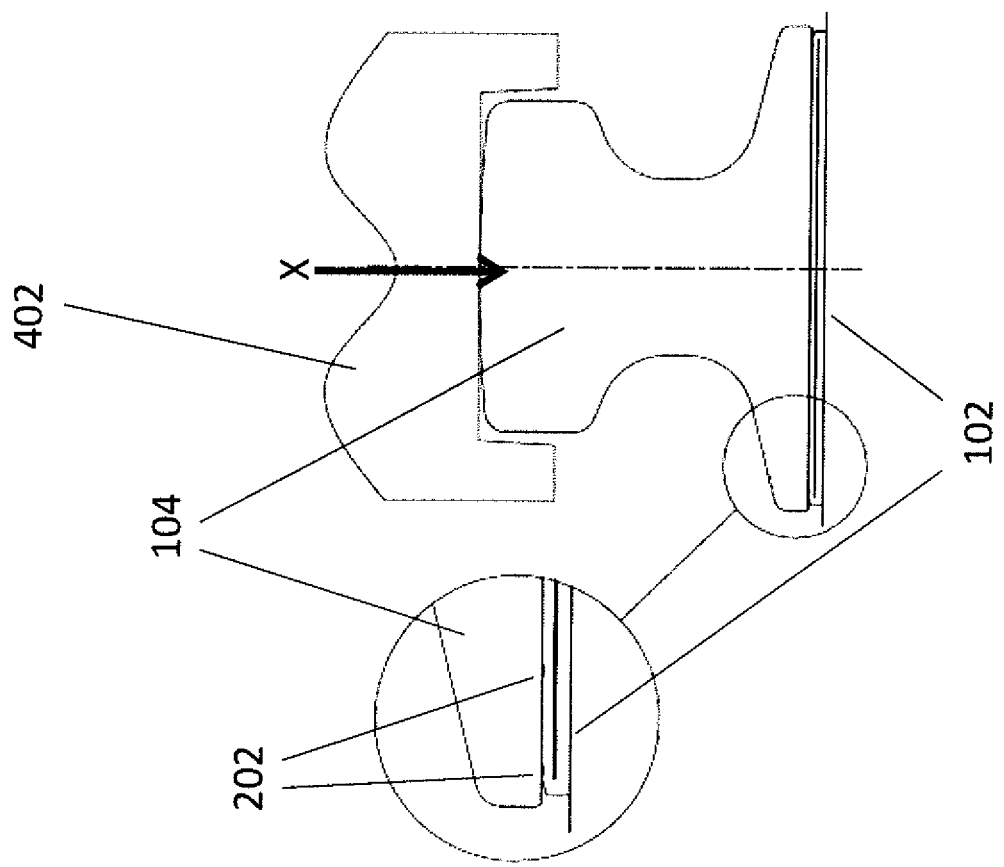

RAIL MEMBER AND RAIL SYSTEM

FIELD

The present invention relates to a rail member and rail system. Particularly, but not exclusively, the present invention relates to a rail member and rail system to be used on a gantry crane.

BACKGROUND

Rail pads are used in rail systems to support rails and reduce shock and vibration in a rail system which may be due, for example, to the use of the rail system for supporting a rail for a large structure such as a gantry crane.

Rail systems for supporting such structures are usually supported along their length by a resilient pad interposed between the base of the rail and a support surface for the rail such as a steel girder. The support typically lies on a concrete foundation and provides for load distribution over the foundation. The resilient pads absorb and distribute the loads that act on the rail when a wheel of the crane passes by.

Existing pads typically comprise a steel insert disposed between two rubber layers and have longitudinal grooves in their upper surface. The purpose of these grooves is to give the pad an initial softness when a vertical load, which may be due to a crane wheel running over the rail immediately above the rail pad, is applied. When the load increases the grooves flatten as the pad deforms, which causes the pad to become stiffer thereby reducing bending stresses in the rail.

The sustained loading on the rail pad can cause multiple problems in the rail pad. Lateral tearing can manifest along the edge of the steel insert, particularly where the steel insert terminates in line with the bottom of a groove so there is a very small cross section of rubber. Sustained loading on the pad also results in axial splitting along the centre of the pad and the steel insert.

The pad may also displace due to lubrication from fluids that are within the recess of a crane rail. This fluid can sit in the grooves of the pad and when a wheel from a crane passes over the rail this fluid is pushed back and forth along the longitudinal groove and cannot escape. This generates a hydraulic effect within the grooves. The presence of the fluid within the grooves means the grooves cannot flatten when a vertical load is applied which causes increased stresses on the rail pad and ultimate failure along the grooves. Such fluids may also contain water that will cause aquaplaning and subsequent lateral displacement of the rail pad.

Aspects and embodiments were devised with the foregoing in mind.

SUMMARY

Viewed from a first aspect, there is provided a rail member comprising a resiliently flexible elongate substrate comprising first and second major surfaces, the member comprising at least one channel formation formed transversally relative to the longitudinal axis of the elongate substrate across at least one of the first or second major surfaces.

Such transversally formed channels enable fluid, which may include water, and other detritus (hereinafter "debris") that becomes deposited in the channels to be pumped out. As the wheel passes over the rail the channel is closed and the cross section of the channel is reduced which causes the fluid trapped in the channels to be pumped away from the rail and out of the rail member rather than allowing the fluid to be moved axially backwards and forwards along the longitudinal axis of the rail pad. Pumping the fluid away from the channels reduces the hydraulic effect of the debris that is trapped in the channels. This reduces the stresses on the rail pad due to sustained loading from, say, a crane wheel, and potential aquaplaning of the pad due to water becoming trapped in the channels.

The rail member may comprise a plurality of channels formed transversally relative to the longitudinal axis of the elongate surface. Increasing the number of channels provides the effect of a network of channels which increases the amount of debris that can be pumped out from the rail member as one passage of a wheel will apply a load sufficient to clear more than one channel.

The plurality of channels may be arranged in a number of directions transverse to the longitudinal axis of the substrate. The plurality of channels may be transversally arranged in opposing directions relative to the longitudinal axis of the elongate substrate. The plurality of channels may also form diamond-shape formations.

Providing a plurality of channels that are diagonally aligned in a number of directions means that the effect of the diagonally aligned channel, i.e. the pumping of debris away from the rail pad, can be amplified as it can take place irrespective of the direction of the movement of the object that is applying the load to the rail pad, for example a crane wheel.

Optionally, the channels may be formed at an angle of 45 degrees to the longitudinal axis of the substrate.

The rail member may also be tapered along at least a part of one or both of its longitudinal side edges. The taper may form a chamfer along the longitudinal axis. Using a tapered rail member reduces the stress concentration around the steel insert during loading.

DESCRIPTION

Figure 2:
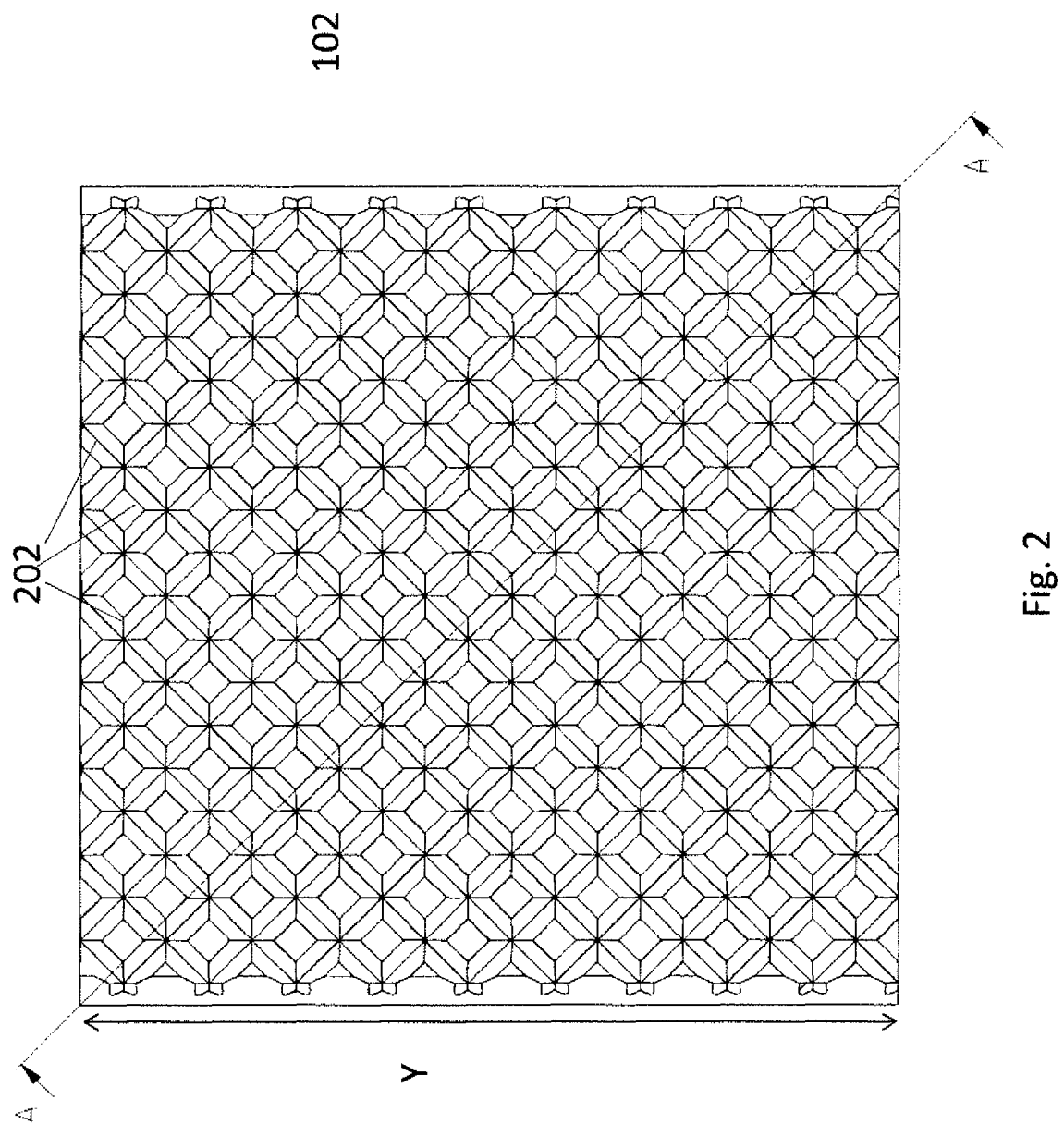
Figure 3:
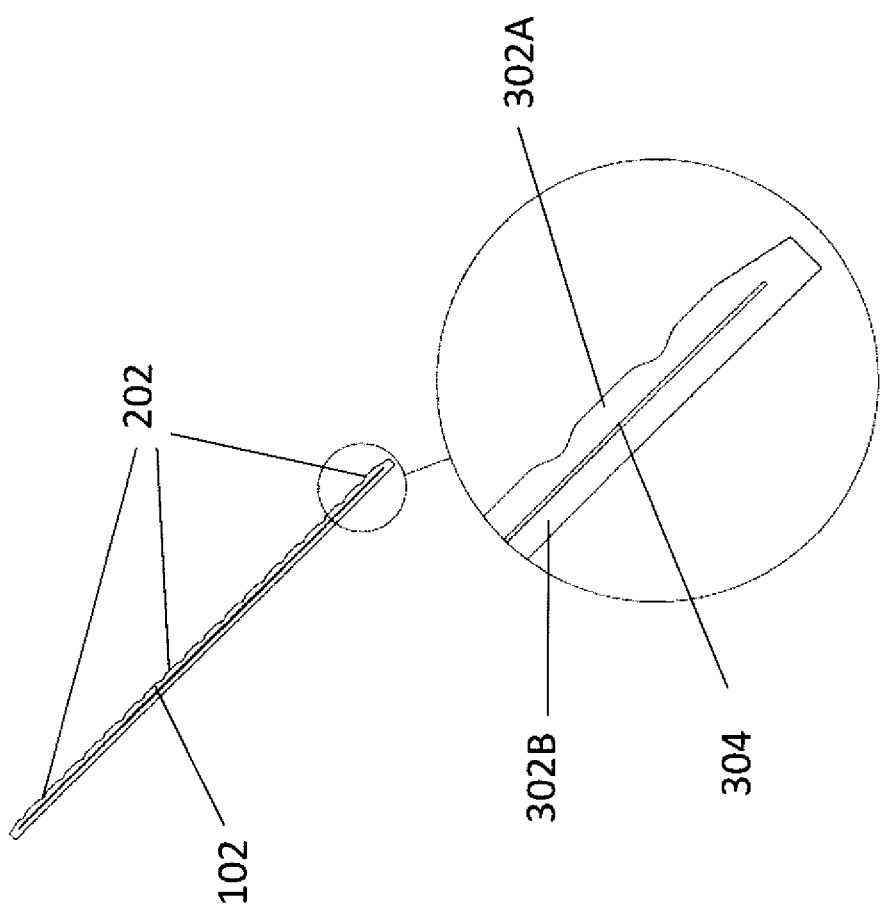
Figure 4A:
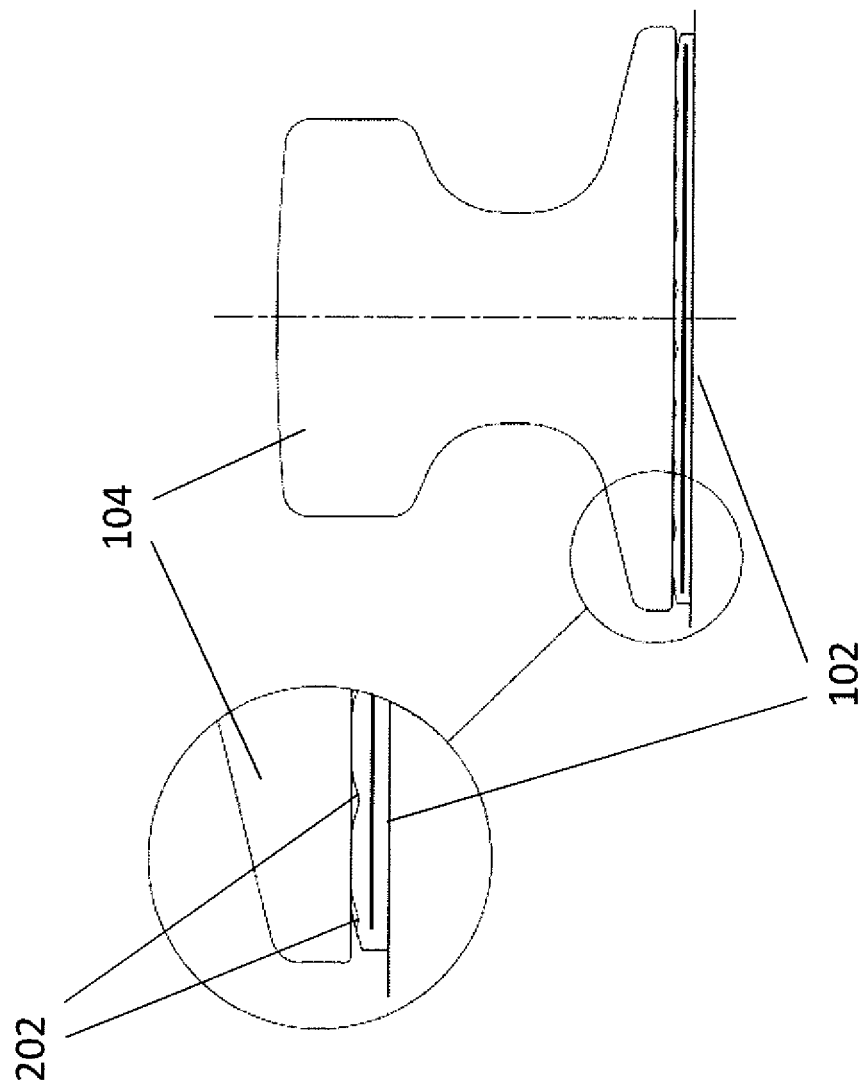
Figure 5:
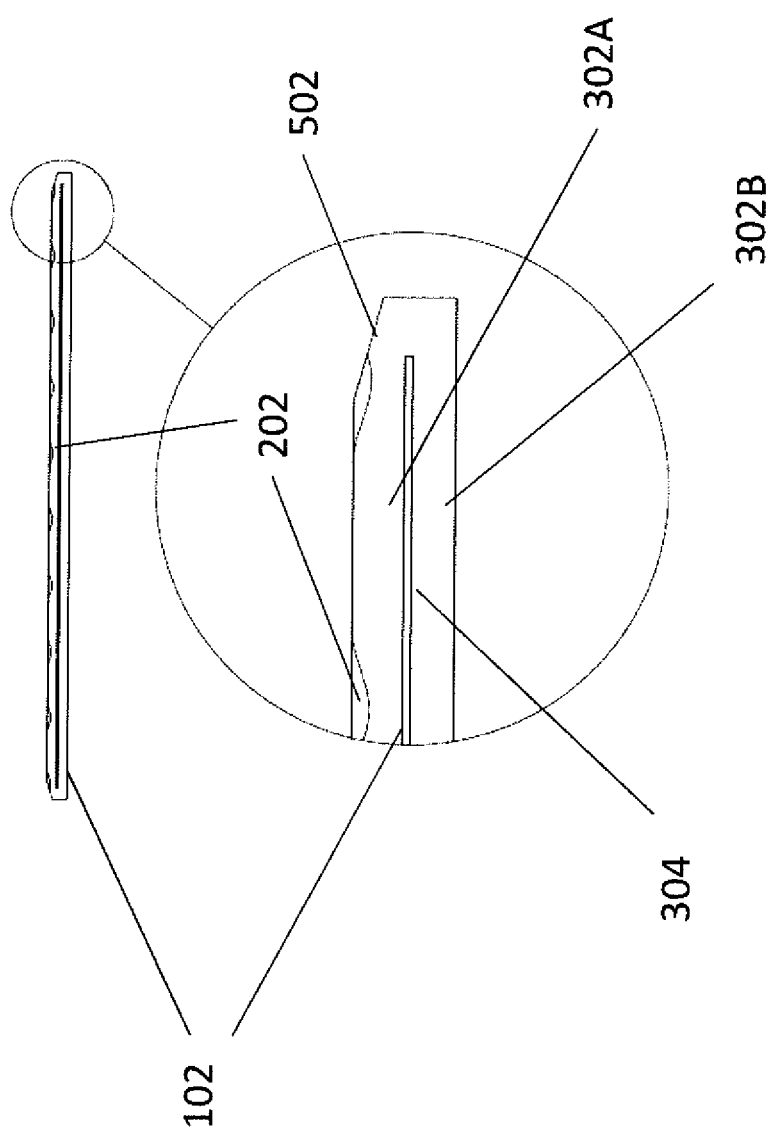

An embodiment will now described by way of example only and with reference to the following figures, in which:

FIG. 1 schematically illustrates a transverse sectional view through a rail system comprising a rail pad in accordance with the embodiment;

FIG. 2 schematically illustrates a rail member in top side view with a sectional line A-A across a diagonal of the rail member;

FIG. 3 schematically illustrates a cross-sectional view of the rail member across the A-A sectional line;

FIG. 4a schematically illustrates the cross section of the channel in the absence of loading from the crane wheel;

FIG. 4b schematically illustrates the cross section of the channel in the presence of loading from the crane wheel; and FIG. 5 schematically illustrates a tapered portion of a rail pad in accordance with an embodiment of the present invention.

FIG. 1 illustrates a general overview of a rail system 100 comprising a plurality of elongate rail pads 102 in accordance with the embodiment. The rail system 100 further comprises an I-section rail 104, a plurality of pairs of clips 106 and a steel girder 108. The rail pads 102 are interposed end-to-end between the rail 104 and the steel girder 108 along the length thereof. The pairs of clips 106 are spaced apart at intervals along the end of the rail and serve to hold the rail 104 and rail pads 102 in-situ along the length of the girder 108. The steel girder lies on a foundation 110 which is fixed to the ground 112. The rail 104 may be fixed directly to the foundation or to another elongate support surface.

A rail system of the type illustrated in FIG. 1 can be used for a gantry crane but can be used for other systems that require a rail system. The wheels of a gantry crane will move on the rail 104 during operation and apply considerable loads to the rail 104.

FIG. 2 schematically illustrates a top view of the rail pad 102 with a diagonal section line A-A. The longitudinal axis of the rail pad 102 extends co-axially with line Y. The rail pad 102 comprises a series of v-shaped spaced apart channels 202 (the channels are not enumerated separately to aid clarity) that are aligned diagonally relative to longitudinal axis Y at an angle of approximately 45 degrees on the top surface of the rail pad 102.

In the described embodiment the channels 202 are formed in the top surface of the rail pad but one or more channels could similarly be formed in the bottom surface of the rail pad 102. Approximately 45 degrees means 45 degrees to within standard engineering tolerances in this area. An angle of 45 degrees is a simpler angle to implement from a tooling perspective.

As can be seen in FIG. 2, the channels 200 are moulded or otherwise formed to extend across the top surface of the pad in a plurality of directions. One or more of the channels 200 may be parallel to one or more of the other channels 200. One or more other channels 200 may be oriented transversely relative to one or more of the other channels 200 and the longitudinal axis Y. One or more channels 200 may form diamond-shaped formations on the respective top surface of the rail pad 102.

The structure of the rail pad 102 and the action of the channels 200 to provide a conduit for debris can be better understood from a cross-sectional view of the channel as illustrated in FIG. 3. FIG. 3 illustrates a cross section of the rail pad 102 along the sectional line A-A. The lower part of FIG. 3 also illustrates an end portion of the rail pad 102 in magnified view.

We now describe the structure of the rail pad 102 of the embodiment with reference to FIG. 3. The rail pad 102 is produced by disposing a thin steel reinforcement 304 between two resiliently deformable layers 302A, 302B, which may be formed of an elastomeric material such as rubber. This is achieved by extrusion or compression moulding. Typically, the pads 102 are around 12 meters long but vary in width according to the rail they will be used for. The clips 106 constrain the rail pads 102 against lateral movement. The longitudinally-extending steel reinforcement 304 acts to prevent snaking of the rail pads 102, which can occur due to sustained loading causing the rail pad 102 to displace laterally at points between the adjacent pairs of clips 106. The longitudinally-extending reinforcement 304 can be of any material which is more resilient than the resiliently deformable material of the layers 302A, 302B. Although it is preferred that the resiliently deformable material completely surrounds the longitudinally-extending reinforcement 304, the reinforcement 304 may be exposed, for example on the underside of the pad 102.

We will now describe, using the cross-sectional diagrams of FIGS. 4a and 4b, the changing cross section of the channels 200 due to loading on the rail 104 from a crane wheel.

FIG. 4a illustrates an unloaded position wherein the rail 104 is sat in its unloaded position on the rail pad 102. The magnified portion of FIG. 4a illustrates the cross section of the channels 202 in this position. In this position, it can be seen from FIG. 4a that the channels 200 are non-zero in cross-sectional area where the base is much narrower than the mouth.

FIG. 4b illustrates a loaded position wherein the rail 104 is sat in a position where load is applied by a crane wheel 402 in the direction of arrow X. The loading in the direction of arrow X forces the rail 104 towards the rail pad 102.

The resilient flexibility of the rail pad 102 means the rail pad 102 will compress under the loading from the rail 104 which substantially reduces the cross section of the channel 202. It can be seen from FIG. 4b that the cross sectional area of the channel 202 has become effectively zero due to the loading in the direction of arrow X. This means that any debris occupying the channel 202 will be pushed out of the rail pad 102 due to the hydraulic effect caused by the loading of the rail 104 on the rail pad 102 and the diagonal alignment of the channels relative to the longitudinal axis of the rail pad 102.

In use, a crane wheel will move backwards and forwards in the direction of Y along rail 104 and deposit debris in the channels 202.

The diagonally aligned channels 202 provide a conduit for the debris deposited by the movement backwards and forwards along rail 104. Each of the channels 202 comprise a start point at an interior point on the rail paid 102, i.e. a position that could be considered to be inside the surface on which the channel is formed and an end point parallel with the Y-axis, i.e. the channel leads out of the rail pad 102.

The conduit provided by the channels 202 enables the rail pad 102 to be flushed of debris. This is achieved as the vertical loading applied by the crane wheel will push the rail 104 down onto the rail pad 102 to seal the channel 202 and cause the pad 102 to compress by around 1 mm but this can vary dependent upon the vertical load applied by the crane wheel. The compression of the pad 102 results in compression of the channel 202. The compression of the channel 202 reduces the cross section of the channel 202 which forces the debris out of the channel 202. Pushing the debris out of the channel 202 causes the debris to be expelled from the rail pad 102.

The resilient flexibility of the rail pad 102 means that after the loading has been applied and then relieved by the passing of the crane wheel, the rail pad 102 will recover its original shape to enable the expulsion of the debris to be iterated multiple times, thereby keeping the channels 202 clear of debris and reducing the effect of the debris on the positioning of the rail pad 102. That is to say, by keeping the channels clear of debris the lateral displacement of the rail pad 102 due to lubrication of the rail pad 102 by fluids is reduced.

Orienting the channels 202 diagonally also provides the additional advantage that they are not parallel with the rail 104. This reduces the manifestation of weak points due to the channel 202 which propagate through the rail pad 102 and cause splits to propagate along the rail pad 102 due to sustained loading from the forward and backward movement of the crane wheel.

Optionally or additionally, the edge of the rail pad 102 in the longitudinal direction Y may, at least in part, be tapered to form a chamfer along at least a part of the longitudinal edge of the rail pad 102. This is illustrated in FIG. 5.

FIG. 5 illustrates an end view of the rail pad 102 comprising channels 202 and thin steel reinforcement 304. FIG. 5 also comprises a magnified portion of the end 502 of the rail pad 102 in the direction Y. The end 502 is tapered. The thin steel reinforcement 304 terminates within the tapered end 502.

Steel reinforcement 304 is bonded to the rubber layers in such a way that the pad acts as a bridge bearing. During loading, as the tapered portion 502 is not generally compressed by the loading, the stress concentration around the steel reinforcement 304 is removed as the steel reinforcement 304 terminates within the tapered end 502. Removing the stress concentration around the steel reinforcement reduces the lateral displacement of the rail pad 102.

The invention claimed is:

1. A rail member comprising a resiliently flexible elongate substrate comprising first and second major surfaces, the member comprising at least one channel formation formed transversally relative to the longitudinal axis of the elongate substrate across at least one of the first or second major surfaces, wherein an insert extends longitudinally along the member, wherein the at least one channel formation comprises a plurality of channels formed transversally relative to the longitudinal axis of the elongate substrate, wherein the plurality of channels are formed transversally across the respective at least one of the first or second major surfaces in opposing directions relative to the longitudinal axis of the elongate substrate, wherein the plurality of channels form diamond-shaped formations across the respective first or second major surface.

2. The rail member of claim 1, wherein an insert is positioned between the first and second major surfaces.

3. The rail member of claim 1, wherein at least one of the plurality of channels is formed transversally of each of the other of the plurality of channels.

4. The rail member of claim 1, wherein at least a first one of the plurality of channels is formed in parallel to at least a second one of the plurality of channels.

5. The rail member of claim 1, wherein at least a first one of the plurality of channels is formed perpendicularly to at least a second one of the plurality of channels.

6. The rail member of claim 1, wherein the elongate substrate is tapered along at least a part of one or both of its longitudinal side edges.

7. The rail member of claim 6, wherein the tapered edge forms a chamfer along at least a part of the longitudinal side edges.

8. The rail member of claim 1, wherein the insert is formed at least in part from steel.

9. A rail system, the system comprising an elongate rail seated on a rail member according to claim 1.

10. The rail system of claim 9, wherein the rail member is disposed between the rail and support surface.

11. The rail system of claim 10, wherein the rail member co-extends with the rail along the length thereof.

12. The rail system of claim 11, wherein the rail is secured to the support surface by a plurality of clips disposed at intervals along the length of the rail, the rail member extending between the rail and support surface between each adjacent clip.

13. A crane system comprising a crane having one or more wheels seated on the rail system of claim 9.

14. A rail member comprising a resiliently flexible elongate substrate comprising first and second major surfaces, the member comprising at least one channel formation formed transversally relative to the longitudinal axis of the elongate substrate across at least one of the first or second major surfaces, wherein an insert extends longitudinally along the member, wherein the at least one channel is formed at an angle of 45 degrees to the longitudinal axis of the elongate substrate.

15. The rail member of claim 14, wherein an insert is positioned between the first and second major surfaces.

16. The rail member of claim 14, wherein at least one of the plurality of channels is formed transversally of each of the other of the plurality of channels.

17. The rail member of claim 14, wherein at least a first one of the plurality of channels is formed in parallel to at least a second one of the plurality of channels.

18. The rail member of claim 14, wherein at least a first one of e plurality of channels is formed perpendicularly to at least a second one of the plurality of channels.

19. The rail member of claim 14, wherein the elongate substrate is tapered along at least a part of one or both of its longitudinal side edges.

20. The rail member of claim 14, wherein the insert is formed at least in part from steel.

* * * * *